(12) United States Patent
Qu

(10) Patent No.: US 9,134,539 B2
(45) Date of Patent: Sep. 15, 2015

(54) SYSTEM AND METHOD FOR CONTROLLING LASER LIGHTS IN AN ELECTRONIC DEVICE

(75) Inventor: Kai-Bo Qu, Shenzhen (CN)

(73) Assignees: SHENZHEN FUTAIHONG PRECISION INDUSTRY CO., LTD., Shenzhen (CN); Chi Mei Communication Systems, Inc., New Taipei (TW)

( * ) Notice: Subject to any disclaimer, the term of this patent is extended or adjusted under 35 U.S.C. 154(b) by 513 days.

(21) Appl. No.: 13/533,986

(22) Filed: Jun. 27, 2012

(65) Prior Publication Data

US 2013/0161482 A1 Jun. 27, 2013

(30) Foreign Application Priority Data

Dec. 22, 2011 (CN) .......................... 2011 1 0435657

(51) Int. Cl.
| | |
|---|---|
| *H01L 27/00* | (2006.01) |
| *G02B 27/20* | (2006.01) |
| *H01S 3/10* | (2006.01) |
| *G02F 1/23* | (2006.01) |
| *G02F 1/01* | (2006.01) |

(52) U.S. Cl.
CPC . *G02B 27/20* (2013.01); *H01S 3/10* (2013.01); *H01S 3/10069* (2013.01); *G02F 1/01* (2013.01); *G02F 1/23* (2013.01)

(58) Field of Classification Search
CPC ....... G02B 27/20; H01S 3/10; H01S 3/10069; G02F 1/01; G02F 1/123
USPC .................. 250/208.1; 345/690; 348/725, 744
See application file for complete search history.

(56) References Cited

U.S. PATENT DOCUMENTS

| | | | |
|---|---|---|---|
| 5,805,735 A * | 9/1998 | Chen et al. ..................... | 382/239 |
| 2009/0122275 A1 * | 5/2009 | Nagashima et al. ............ | 353/85 |

* cited by examiner

*Primary Examiner* — Georgia Y Epps
*Assistant Examiner* — Kevin Wyatt
(74) *Attorney, Agent, or Firm* — Novak Druce Connolly Bove + Quigg LLP

(57) ABSTRACT

In a method for controlling laser lights in an electronic device, a laser light function of the electronic device is enabled by switching on a first switch. The method samples predetermined pixels from a background color of a current slide displayed on a display screen at each predetermined time interval, and obtains RGB values of the predetermined pixels. A first average of R values and a second average of G values of the predetermined pixels are calculated. If the first average is greater than a predetermined color threshold value, the second laser light is enabled to emit laser with a second color. If the first average is less than or equal to the predetermined color threshold value and the second average is greater than the predetermined color threshold value, the first laser light is enabled to emit the laser with a first color.

18 Claims, 4 Drawing Sheets

SYSTEM AND METHOD FOR CONTROLLING LASER LIGHTS IN AN ELECTRONIC DEVICE

BACKGROUND

1. Technical Field

Embodiments of the present disclosure relate to laser light controlling technology, and more particularly to a system and method for controlling laser lights in an electronic device.

2. Description of Related Art

A laser pen is often used during a lecture or in a meeting. When a projector is showing one of slides, a speaker may use the laser pen to point out relevant content in the projected slide. Most electronic devices (e.g. mobile devices) can display the slides and play the slides using the projector. However, if a main background color of one slide is red and the laser pen also emits a red laser color, position on the slide pointed by the laser pen may not be clear enough to view. Even if the speaker uses two laser pens that emit different laser colors, the speaker has to switch the two laser pens manually according to the different background colors of the slides.

DETAILED DESCRIPTION

Figure 1:
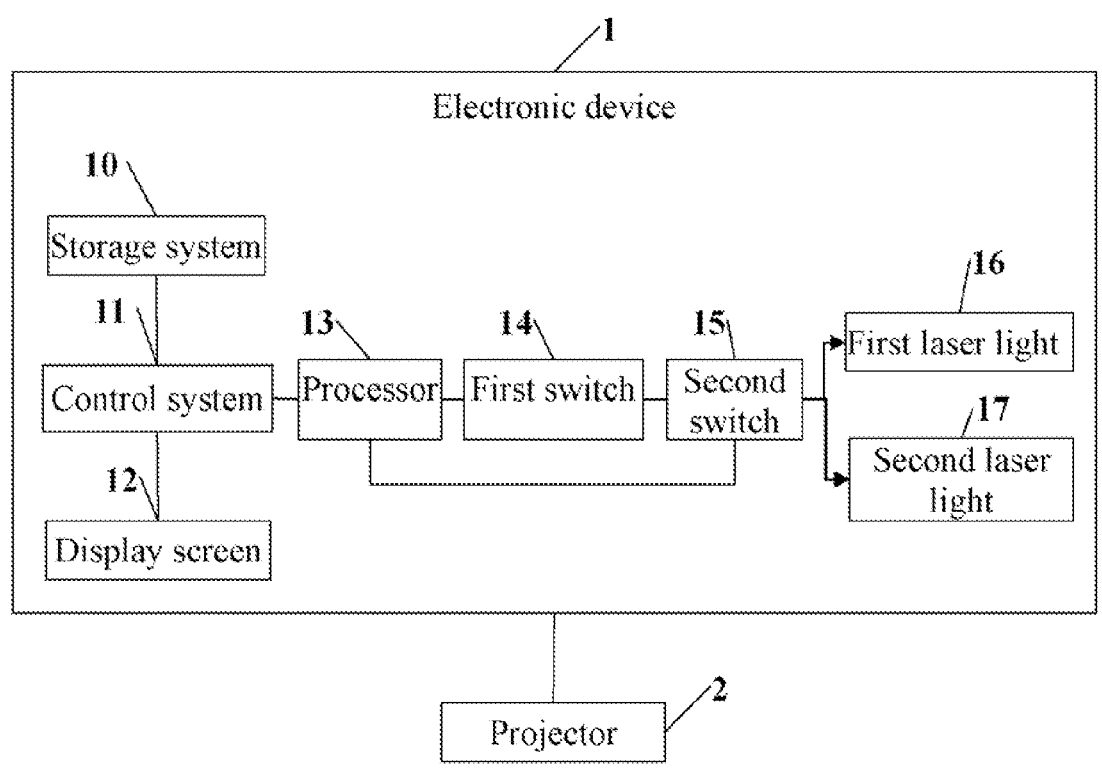
FIG. 1 is a block diagram of one embodiment of an electronic device including a control system.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one."

In general, the word "module" as used herein refers to logic embodied in hardware or firmware, or to a collection of software instructions, written in a programming language, such as, Java, C, or assembly. One or more software instructions in the modules may be embedded in firmware, such as in an erasable-programmable read-only memory (EPROM). The modules described herein may be implemented as either software and/or hardware modules and may be stored in any type of non-transitory computer-readable medium or other storage device. Some non-limiting examples of non-transitory computer-readable media include compact discs (CDs), digital versatile discs (DVDs), Blu-ray disks, flash memory, and hard disk drives.

FIG. 1 is a block diagram of one embodiment of an electronic device 1 including a control system 11. The electronic device 1 further includes a storage system 10, a display screen 12, at least one processor 13, a first switch 14, a second switch 15, a first laser light 16, and a second laser light 17 (e.g., light emitting diodes). The storage system 10 may be a memory of the electronic device 1, or an external storage card, to store data of the electronic device 10, such as, slides of the electronic device 1, for example. The electronic device 1 can display the slides. The display screen 12 displays visual data of the electronic device 1, such as the slides. In one embodiment, the electronic device 1 may connect to a projector 2 to play the slides. The at least one processor 13 executes one or more computerized codes and other applications of the electronic device 1, to provide functions of the control system 11. The control system 11 may switch between the first laser light 16 and the second laser light 17 automatically according to changes of background colors of the slides displayed on the display screen 12.

The first switch 14 is a single pole single throw (SPST) analog switch including a first input port (denoted as the first input port "a1"), a first control port (denoted as the first control port "a2"), and a first output port (denoted as the first output port "a3"). In one embodiment, the first switch 14 is high level effective. For example, if a first voltage level is output to the first control port "a2", the first switch 14 is switched on. If a second voltage level is output to the first control port "a2", the first switch 14 is switched off. In one embodiment, the first voltage level may be a high voltage that represents a logical "1". The second voltage level may be a low voltage that represents a logical "0". The high voltage may be 1V, and the low voltage may be 0V, for example. In other embodiments, the first switch 14 may be low level effective.

The second switch 15 is a single pole double throw (SPDT) analog switch including a second input port (denoted as the second input port "b1"), a second control port (denoted as the second control port "b2"), a second output port (denoted as the second output port "b3"), and a third output port (denoted as the third output port "b4"). In one embodiment, if the first voltage level is output to the second control port "b2", the second switch 14 controls the second input port "b1" to connect to the second output port "b3". If the second voltage level is output to the second control port "b2", the second switch 14 controls the second input port "b1" to connect to the third output port "b4".

Figure 2:
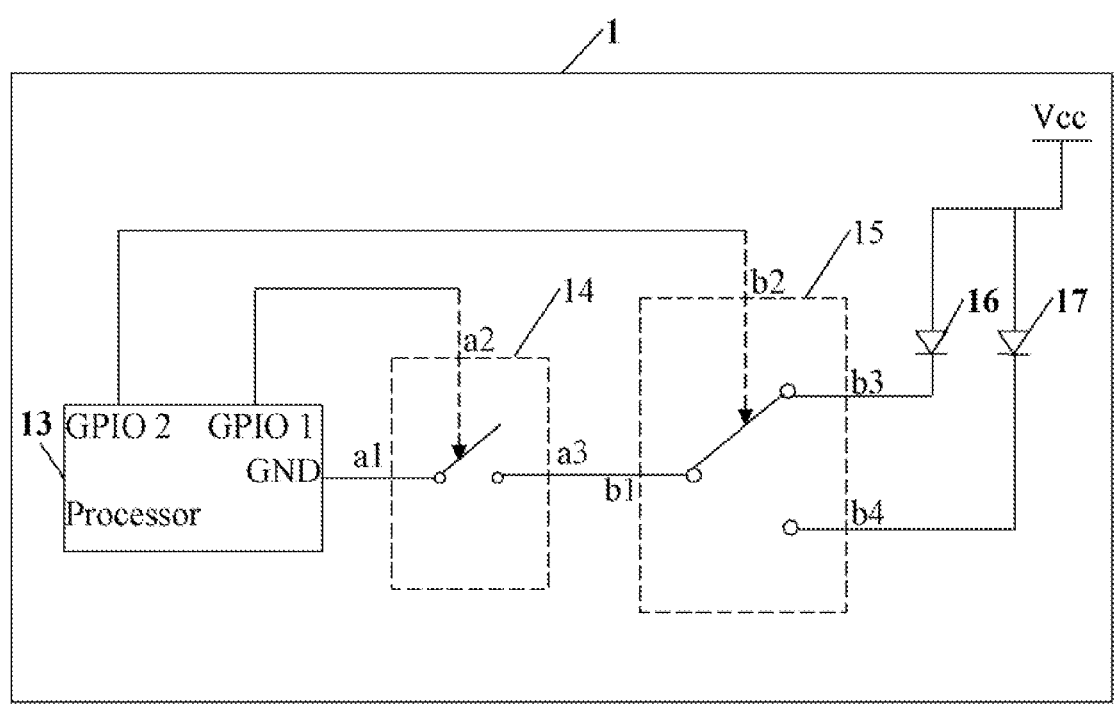
FIG. 2 is a schematic diagram of one embodiment of a circuit connection of laser lights in the electronic device of FIG. 1.

The first laser light 16 may emit laser with a first color (e.g. red color), and the second laser light 17 may emit laser with a second color (e.g. green color). In some embodiments, the first color is distinct from the second color. The first laser 16, the second laser light 17, the first switch 14, and the second switch 15 are connected as shown in FIG. 2. As shown in FIG. 2, the first input port "a1" connects to a ground (GND) pin of the processor 13, and the first control port "a2" connects to a first general-purpose input/output (GPIO) pin (e.g. GPIO 1 in FIG. 2) of the processor 13. The first output port "a3" of the first switch 14 connects to the second input port "b1" of the second switch 15, and the second control port "b2" connects to a second GPIO pin (e.g. GPIO 2 in FIG. 2) of the processor 13. The second output port "b3" connects to a cathode of the first laser light 16, and the third output port "b4" connects to a cathode of the first laser light 17. Anodes of both the first laser light 16 and the second laser light 17 connect to a power supply pin of the electronic device 1 (e.g. Vcc of the electronic device 1).

In one embodiment, if the first switch 14 is switched on and the second input port "b1" connects to the second output "b3", the first laser light 16 is enabled to emit the laser with the first color and the second laser light 17 is disabled. If the first switch 14 is switched on and the second input port "b1" connects to the third output "b4", the second laser light 17 is enabled to emit the laser with the second color and the first laser light 16 is disabled. If the first switch 14 is switched off, both the first laser light 16 and the second laser light 17 are disabled to emit the laser, that is, a function of the laser lights of the electronic device 1 is closed.

Figure 3:
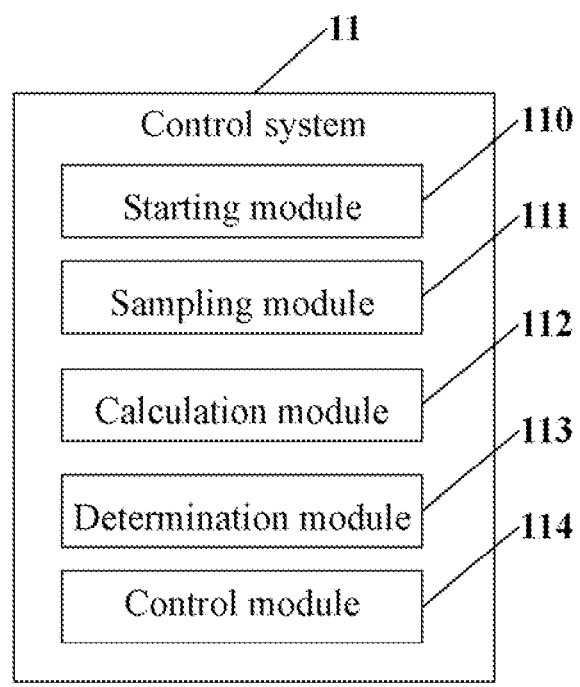
FIG. 3 is a block diagram of function modules of the control system 11 included in the electronic device of FIG. 1.

FIG. 3 is a block diagram of function modules of the control system 11 included in the electronic device of FIG. 1. In the embodiment, the control system 11 may include a starting module 110, a sampling module 111, a calculation module 112, a determination module 113, and a control module 114. The modules 110-114 comprise computerized codes in the form of one or more programs that are stored in the storage system 10. The computerized codes include instructions that are executed by the at least one processor 13 to provide functions for the modules 110-114. Details of each of the modules will be given in FIG. 4.

Figure 4:
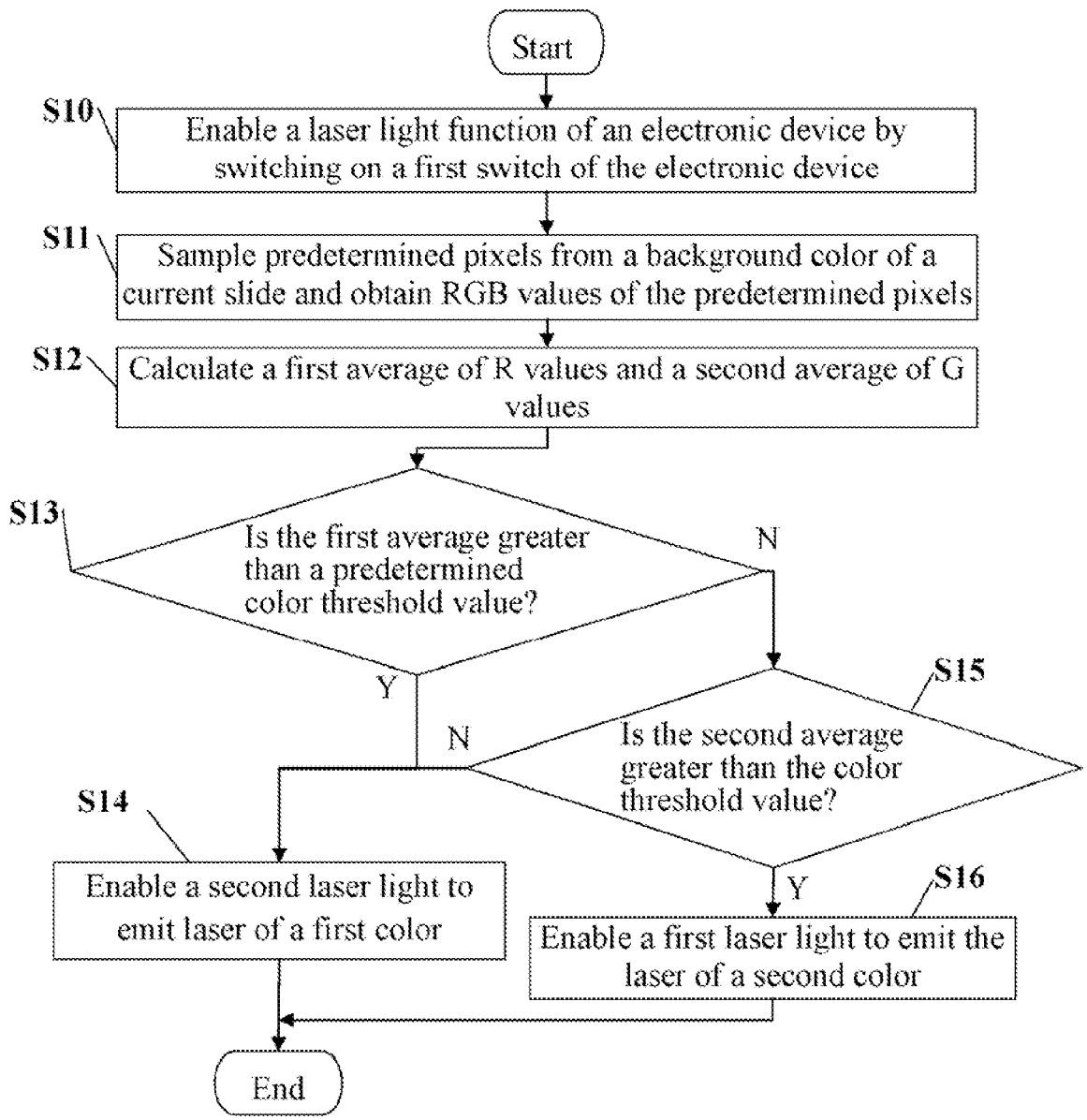
FIG. 4 is a flowchart of one embodiment of a method for controlling laser lights to display slides in the electronic device of FIG. 1.

FIG. 4 is a flowchart of one embodiment of a method for controlling laser lights in the electronic device of FIG. 1. Depending on the embodiment, additional steps may be added, others deleted, and the ordering of the steps may be changed.

In step S10, the starting module 110 enables a laser light function of the electronic device 1 by switching on the first switch 14. In one embodiment, when the electronic device 1 plays a slide file including a plurality of slides using the projector 2, and the user of the electronic device 1 turns on the laser light function (e.g. the user triggering a predetermined instruction of enabling the laser light function), the starting module 110 switches on the first switch 14. The starting module 110 switches on the first switch 14 by controlling the processor 13 to output the first voltage level to the first control port "a2" through the first GPIO.

In step S11, the sampling module 111 samples predetermined pixels from a background color of a current slide displayed on the display screen 12 at each predetermined time interval, and obtains RGB values of the predetermined pixels. A number of the predetermined pixels and coordinates of the predetermined pixels on the display screen 12 are predetermined by the sampling module 111. In other embodiments, the sampling module 111 may sample the predetermined pixels when the slide is switched to a next slide.

In step S12, the calculation module 112 calculates a first average of R values and a second average of G values of the predetermined pixels, according to the RGB values of the predetermined pixels. For example, if the sampling module 111 obtains the RGB values of number "n" pixels including the first pixel (R1, G1, B1), the second pixel (R2, G2, B2), . . . , and the "nth" pixel (Rn, Gn, Bn). The calculation module 112 calculates the first average of the R values according to a formula of "(R1+R2+ . . . +Rn)/n", and calculates the second average of the G values according to a formula of "(G1+G2+ . . . +Gn)/n".

In step S13, the determination module 113 determines whether the first average of the R values is greater than a color threshold value. For example, the color threshold value may be predetermined to be 100. In one embodiment, if the first average of the R values is greater than the color threshold value, the background color of the current slide is determined to be partial red, and step S14 is implemented. If the first average of the R values is less than or equal to the predetermined color threshold value, the background color of the current slide is determined to be partial green, and step S15 is implemented.

In step S14, the control module 114 enables the second laser light 17 to emit the laser with the second color (e.g. green color) using the second switch 15. In one embodiment, the control module 114 controls the processor 13 to output the second voltage level to the second control port "b2" through the second GPIO, and controls the second input port "b1" connects to the third output port "b4". When the second input port "b1" is connected to the third output port "b4", the second laser light 17 emits the laser with the second color which is distinct from a partial red background of the current slide. If the second input port "b1" is connected to the third output port "b4" originally before sampling the predetermined pixels, that is, the second laser light 17 emits the laser with the second color before sampling the predetermined pixels, the control module 114 maintains the second laser light 17 to emit the laser with the second color.

In step S15, the determination module 113 determines whether the second average of the G values is greater than the color threshold value. In one embodiment, if the second average of the G values is greater than the color threshold value, the background color of the current slide is determined to be partial green, and step S16 is implemented. If the second average of the G values is less than or equal to the color threshold value, the background color of the current slide is determined to be partial red, and step S14 is repeated.

In step S16, the control module 114 enables the first laser light 16 to emit the laser with the first color (e.g. red color) using the second switch 15. In one embodiment, the control module 114 controls the processor 13 to output the first voltage level to the second control port "b2" through the second GPIO, and controls the second input port "b1" connects to the second output port "b3". When the second input port "b1" is connected to the second output port "b3", the first laser light 16 emits the laser with the first color which is distinct from a partial green background of the current slide. If the second input port "b1" is connected to the second output port "b3" originally before sampling the predetermined pixels, that is, the first laser light 16 emits the laser with the first color before sampling the predetermined pixels, the control module 114 maintains the first laser light 16 to emit the laser with the first color.

When the user turns off the laser light function of the electronic device 1 by closing the laser file or the electronic device 1 finishes playing the slide file, the starting module 110 may disable the laser light function by switching off the first switch 14, to save power of the electronic device 1. In one embodiment, the starting module 110 switches off the first switch 14 by controlling the processor 13 to output the second voltage level to the first control port "a2" through the first GPIO.

All of the processes described above may be embodied in, and be fully automated via, functional code modules executed by one or more general-purpose processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

The described embodiments are merely possible examples of implementations, and have been set forth for a clear understanding of the principles of the present disclosure. Many variations and modifications may be made without departing substantially from the spirit and principles of the present disclosure. All such modifications and variations are intended to be included herein within the scope of this disclosure and the described inventive embodiments, and the present disclosure is protected by the following claims.

What is claimed is:

1. A computer-implemented method for controlling laser lights in an electronic device, the electronic device comprising a first laser light and a second laser light, the method comprising:

enabling a laser light function by switching on a first switch of the electronic device;

sampling predetermined pixels from a background color of a current slide displayed on a display screen of the electronic device at each predetermined time interval, and obtaining RGB values of the predetermined pixels;

calculating a first average of R values and a second average of G values of the predetermined pixels, according to the RGB values of the predetermined pixels;

enabling the second laser light to emit laser with a second color using a second switch of the electronic device, the second color being distinct from a partial red background of the current slide, if the first average is greater than a predetermined color threshold value; and enabling the first laser light emit the laser with a first color using the second switch, the first color being distinct from a partial green background of the current slide, if the first average is less than or equal to the predetermined color threshold value and the second average is greater than the predetermined color threshold value.

2. The method according to claim 1, wherein the first switch comprises:

a first input port that connects to a ground pin of a processor of the electronic device;

a first control port that connects to a first general-purpose input/output (GPIO) pin of the processor;

a first output port that connects to a second input port of the second switch; and the second switch further comprises:

a second control port that connects to a second GPIO pin of the processor;

a second output port that connects to a cathode of the first laser light; and a third output port that connects to a cathode of the second laser light, anodes of both the first laser light and the second laser light being connected to a power supply pin of the electronic device.

3. The method according to claim 2, further comprising:

switching on the first switch by controlling the processor to output a first voltage level to the first control port of the first switch through the first GPIO.

4. The method according to claim 2, further comprising:

switching off the first switch by controlling the processor to output a second voltage level to the first control port through the first GPIO, under the condition that the laser light function of the electronic device needs to be disabled or the electronic device finishes playing a slide file comprising the slides in the electronic device.

5. The method according to claim 2, wherein the first laser light is enabled to emit the laser with the first color by controlling the processor to output the first voltage level to the second control port through the second GPIO and controlling the second input port to connect to the second output port, and the second laser light is enabled to emit the laser with the second color by controlling the processor to output the second voltage level to the second control port through the second GPIO and controlling the second input port to connect to the third output port.

6. The method according to claim 1, wherein a number of the predetermined pixels and coordinates of the predetermined pixels on the display screen are predetermined.

7. A non-transitory storage medium storing a set of instructions, when executed by at least one processor of an electronic device, cause the at least one processor to perform a method for the electronic device comprising a first laser light and a second laser light, the method comprising:

enabling a laser light function by switching on a first switch of the electronic device;

sampling predetermined pixels from a background color of a current slide displayed on a display screen of the electronic device at each predetermined time interval, and obtaining RGB values of the predetermined pixels;

calculating a first average of R values and a second average of G values of the predetermined pixels, according to the RGB values of the predetermined pixels;

enabling the second laser light to emit laser with a second color using a second switch of the electronic device, the second color being distinct from a partial red background of the current slide, if the first average is greater than a predetermined color threshold value; and enabling the first laser light emit the laser with a first color using the second switch, the first color being distinct from a partial green background of the current slide, if the first average is less than or equal to the predetermined color threshold value and the second average is greater than the predetermined color threshold value.

8. The non-transitory storage medium according to claim 7, wherein the first switch comprises:

a first input port that connects to a ground pin of a processor of the electronic device;

a first control port that connects to a first general-purpose input/output (GPIO) pin of the processor;

a first output port that connects to a second input port of the second switch; and the second switch comprising:

a second control port that connects to a second GPIO pin of the processor;

a second output port that connects to a cathode of the first laser light; and a third output port that connects to a cathode of the second laser light, anodes of both the first laser light and the second laser light being connected to a power supply pin of the electronic device.

9. The non-transitory storage medium according to claim 8, further comprising:

switching on the first switch by controlling the processor to output a first voltage level to the first control port of the first switch through the first GPIO.

10. The non-transitory storage medium according to claim 8, further comprising:

switching off the first switch by controlling the processor to output a second voltage level to the first control port through the first GPIO, under the condition that the laser light function of the electronic device needs to be disabled or the electronic device finishes playing a slide file comprising the slides in the electronic device.

11. The non-transitory storage medium according to claim 8, wherein the first laser light is enabled to emit the laser with the first color by controlling the processor to output the first voltage level to the second control port through the second GPIO, and controlling the second input port to connect to the second output port; and the second laser light is enabled to emit the laser with the second color by controlling the processor to output the second voltage level to the second control port through the second GPIO, and controlling the second input port to connect to the third output port.

12. The non-transitory storage medium according to claim 7, wherein a number of the predetermined pixels and coordinates of the predetermined pixels on the display screen are predetermined.

13. An electronic device, comprising:

a first switch; a second switch; a first laser light; a second laser light; a display screen; a storage system; at least one processor; and one or more programs that are stored in the storage system and executed by the at least one processor, the one or more programs comprising:

a starting module that enables a laser light function by switching on a first switch of the electronic device;

a sampling module that samples predetermined pixels from a background color of a current slide displayed on the display screen at each predetermined time interval, and obtains RGB values of the predetermined pixels;

a calculation module that calculates a first average of R values and a second average of G values of the predetermined pixels, according to the RGB values of the predetermined pixels;

a control module that enables the second laser light to emit laser with a second color using the second switch, the second color being distinct from at a partial red background of the current slide, if the first average is greater than a predetermined color threshold value; and the control module further enables the first laser light emit the laser with a first color using the second switch, the first color being distinct from at a partial green background of the current slide, if the first average is less than or equal to the predetermined color threshold value and the second average is greater than the predetermined color threshold value.

14. The electronic device according to claim 13, wherein the first switch comprises:

a first input port that connects to a ground pin of a processor of the electronic device;

a first control port that connects to a first general-purpose input/output (GPIO) pin of the processor;

a first output port that connects to a second input port of the second switch; and the second switch comprises:

a second control port that connects to a second GPIO pin of the processor;

a second output port that connects to a cathode of the first laser light; and a third output port that connects to a cathode of the second laser light, anodes of both the first laser light and the second laser light being connected to a power supply pin of the electronic device.

15. The electronic device according to claim 14, wherein the starting module switches on the first switch by controlling the processor to output a first voltage level to the first control port of the first switch through the first GPIO.

16. The electronic device according to claim 14, wherein the starting module further switches off the first switch by controlling the processor to output a second voltage level to the first control port through the first GPIO, if the laser light function of the electronic device needs to be disabled or the electronic device finishes playing a slide file comprising the slides in the electronic device.

17. The electronic device according to claim 14, wherein the control module enables the first laser light to emit the laser with the first color by controlling the processor to output the first voltage level to the second control port through the second GPIO, and controlling the second input port to connect to the second output port, and the control module further enables the second laser light to emit the laser with the second color by controlling the processor to output the second voltage level to the second control port through the second GPIO, and controlling the second input port to connect to the third output port.

18. The electronic device according to claim 13, wherein a number of the predetermined pixels and coordinates of the predetermined pixels on the display screen are predetermined.

* * * * *